J. M. MASON.
CALCULATOR.
APPLICATION FILED MAR. 25, 1908.

923,981.

Patented June 8, 1909.
4 SHEETS—SHEET 1.

FIG. 1.

WITNESSES
Josephine H. Ryan
Ruby M. Banfield

INVENTOR
John M. Mason
by Roberts, Roberts & Cushman
Attorneys

J. M. MASON.
CALCULATOR.
APPLICATION FILED MAR. 25, 1908.

923,981.

Patented June 8, 1909.
4 SHEETS—SHEET 3.

WITNESSES
Josephine H. Ryan
Ruby M. Banfield

INVENTOR
John M. Mason
by
Roberts Roberts & Cushman
Attorneys

J. M. MASON.
CALCULATOR.
APPLICATION FILED MAR. 25, 1908.

923,981.

Patented June 8, 1909.
4 SHEETS—SHEET 4.

Witnesses
Josephine H Ryan
Ruby M Banfield

Inventor
John M. Mason
by Roberts, Roberts & Cushman
Attorneys

UNITED STATES PATENT OFFICE.

JOHN M. MASON, OF BROOKLINE, MASSACHUSETTS, ASSIGNOR TO ODIN ROBERTS, OF BROOKLINE, MASSACHUSETTS.

CALCULATOR.

No. 923,981.  Specification of Letters Patent.  Patented June 8, 1909.

Application filed March 25, 1908. Serial No. 423,092.

*To all whom it may concern:*

Be it known that I, JOHN M. MASON, a citizen of the United States, and resident of Brookline, in the county of Norfolk and State of Massachusetts, have invented new and useful Improvements in Calculators, of which the following is a specification.

My invention relates to calculators and has for its object the provision of a calculating machine which in the mechanical operations of addition or subtraction shall correspond literally to the mental processes.

My invention includes the process of subtraction as a mode of addition, and whether a machine constructed according to my invention operates to add or subtract, the mechanical correspondence of its movements to the mental process is the same.

The principle of my invention lies in the provision of any desired number of wheels or other number carriers and of a like number of mechanical trains each peculiar to one of the number carriers and actuating its own number carrier without direct reference to the others. Each carrier records the completion of a full cycle by moving another number carrier, through direct connections, one division of the cycle. In the decimal system, each accumulated ten of any denomination is the unit of the next and is transferred to the next denomination as a unit increment. In the machine embodying this invention, each number carrier accumulates ten of its units, records the accumulation by transferring unit movement to the next carrier and resumes its own progressive cycle as demanded. The mechanical process is in exact correspondence with the concomitant mental process. My invention is characterized by the provision of means to control the movement of one number carrier (or mechanically associated part) by another in such manner that when one number carrier passes a predetermined point in its movement, it causes movement of another number carrier, imparting to the latter an increment of movement appropriate to the numerical system for which the calculator is designed. Moreover, the control of one number carrier by another (or of one number carrier by a moving part associated with another number carrier) transfers movement independently of the actuating train peculiar to the number carrier affected, so that the movements of the number carrier which are dependent on and controlled by another number carrier, are independent of, though they may be simultaneous with, its movements in response to power applied through its peculiar actuating train. Further, a number carrier in controlling another number carrier to impart to the latter occasional increments of movement, retains uninterrupted control of the moved number carrier irrespective of the movement of the latter in response to its own actuating train.

By a figure of speech, the process of addition is often defined as "putting down" one number and "carrying" one to the next number-place in the denominational series. A machine operating according to my invention performs in reality the process thus figuratively described.

In the drawings hereto annexed, which illustrate a machine embodying my invention, In Fig. 2 a part of the casing of the machine is shown in plan.

In these drawings the machine is shown with its parts more widely separated than might be desirable in actual practice, for the purpose of making clearer the essential relationship of the mechanical factors; and moreover, sundry details which may be found in calculating machines, such as devices for guarding against overthrow or excessive movement of the parts, are omitted for the purpose of avoiding a multiplication of details desirable or essential in practice, but which, however, do not enter into the essentials which embody my invention. (See Figs. 1 and 2 and 7 to 10 inclusive): A suitable casing C is provided for the machine and in this casing the operating keys A are mounted. These operating keys are members of the mechanical actuating trains which impart movement from the hand of the operator to the number carriers which express numerically the result of the operation. The number carriers are as many in number as may be desired and consist of disks E independently and rotatably mounted and carrying upon their rims appropriate series of figures. At C' a glazed opening is provided in the casing through which the uppermost figures on the number carriers E may be viewed. The essential peculiarity of the number carriers E is that they are movable in recurrent cycles and, while rotatably mounted disks are, I believe, invariably employed in calculating machines, it is quite conceivable that specifically different number carriers, movable in recurrent cycles, might be substituted for rotatable disks; these disks represent specifically the mechanical factors necessarily present in any calculating machine, to wit, number carriers movable in recurrent cycles.

Each of the number carriers E has an actuating mechanical train, peculiar to it. In the specific example shown in the drawings, this mechanical train consists of the movement-imparting connections from the number carrier to any one of the keys A in the row of the keys peculiar to the number carrier. In each of these similar mechanical trains, a shaft B is mounted in suitable bearings in the casing and upon this shaft are placed a number of ratchet clutches whereof the external spur gears $B^3$ mesh with the racks $A^2$ which are formed on or carried by the stems $A'$ of the keys A. One of these clutches is shown in detail in Fig. 10. The shaft B carries the ratchet wheel $B'$ with which the pawl $B^2$ engages. This pawl is carried by the outer rim of the clutch barrel whereon the teeth of the spur gear $B^3$ are formed. The keys A are normally held elevated by the springs $A^4$ and the stems $A'$ have their lower bearings in the sockets $A^3$. The teeth of the racks $A^2$ differ in number from key to key so that the depression, say of the key which bears the figure 1 (see Fig. 2) will turn the shaft B less than will the key marked 9. The amount of turning movement given to the shaft B determines the amount of progressive movement of the number carrier which is turned by the mechanical connections from shaft B to shaft D and thence through the bevel gears F and $E'$ (or it may be $F'$, $E'$) and is progressively moved so as to bring the numbers carried on its rim successively into view below the aperture C' in the casing.

Figure 4:
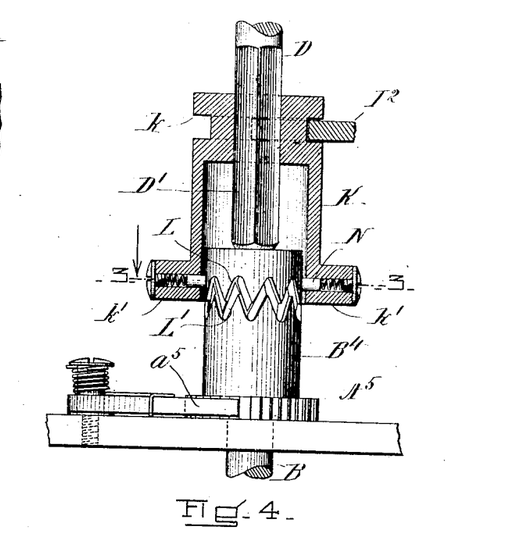
Fig. 4 is a top plan view of the increment-movement mechanism.
Figure 5:
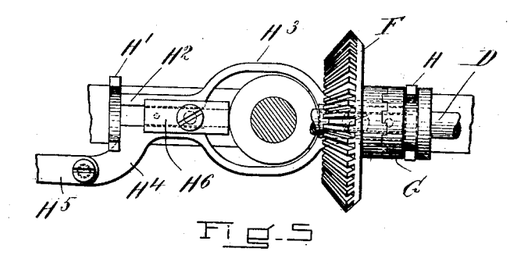
Fig. 5 is a detail on an enlarged scale taken in section on the line 5—5 of Fig. 2.
Figure 6:
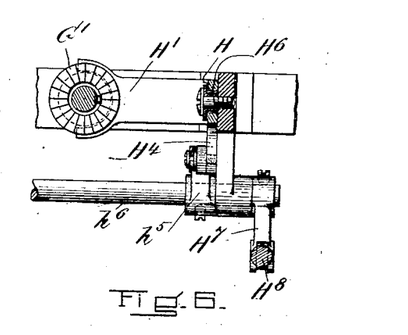
Fig. 6 is a detail viewed sectionally on the line 6—6 of Fig. 2.
Figure 7:
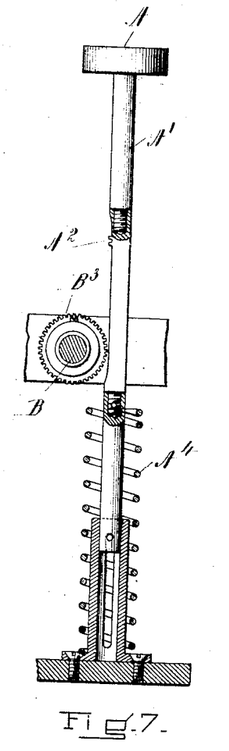
Figs. 7 to 9 inclusive are details on an enlarged scale showing the apparatus keys and their associated mechanism.
Figure 8:
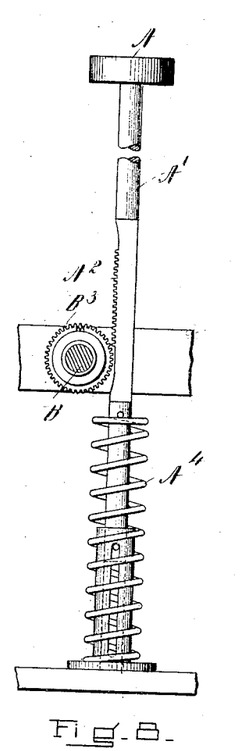
Figure 9:
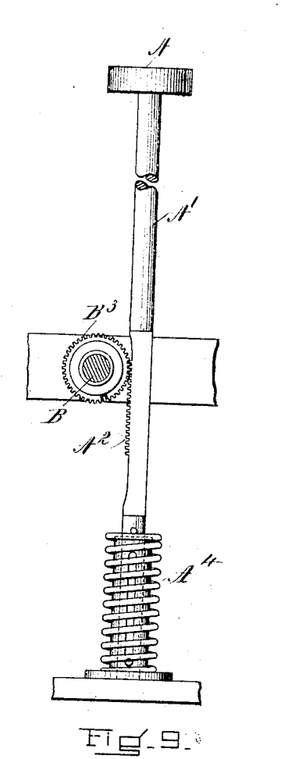
Figure 10:
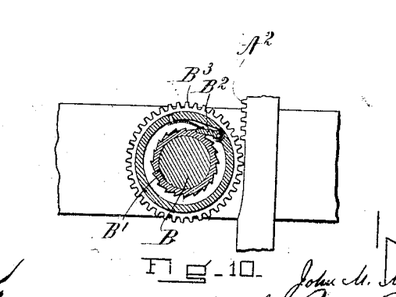
Fig. 10 is a detail showing the section on the line 10—10 of Fig. 1.

Movement is transmitted from the shaft B to the shaft D in the following manner: The cylindrical head $B^4$, formed upon the end of the shaft B is cut into a circumferential zigzag groove L (best seen in Fig. 4). The end of the shaft D adjacent to the shaft B is squared and pointed so that though its pointed end enters in the head $B^4$ the two shafts may rotate independently. The coupling K is mounted to slide upon the square end $D'$ of the shaft D (see Fig. 4). This coupling K is provided with ears $k'$ which are centrally bored out to receive the spring pressed bolts N, the ends of which project into the zigzag groove L. At the other end of the coupling K the groove $k$ receives the forked end of the shipper $I^2$. So long as the shipper is held stationary, the bolts B serve to couple the shaft B and shaft D firmly together so that, for the purpose of transmitting movement from the keys to the number carriers, the actuating train remains a continuous connection. The shaft D is thus "push connected" to the shaft B; that is to say, the shaft B, in its normal position, through the agency of the cam groove in coupling K, rotatively pushes shaft D by means of the bolts N. Assuming for purposes of illustration, that the calculator herein described is arranged to perform its operation in accordance with the decimal system, it is obvious that when, in the process of adding one number to another, the movement of a number carrier takes it past the zero point in the recurrent cycle, it is necessary, if the operation of addition is to be correctly recorded, that each recurrence of the cycle of one number carrier shall be accomplished by a single step movement, that is to say, a movement from one figure to the next upon the number carrier next higher in the series. In the instance herein specifically shown, the number carriers E carry the characters from 1 to 0 twice in the circumference so that for each full rotation of the number carrier corresponding to one column of figures there should be two single step movements of the number carrier next in series, each of said movements taking place as the zero point is passed by the preceding number carrier. This is accomplished according to my invention by connections whereby each number carrier on the mechanical train of which it forms a part as it completes the recurrent cycle, imparts a single step movement to the next number carrier and does this independently of the actuating train of mechanism which connects the latter number carrier with its appropriate row of keys.

Figure 2:
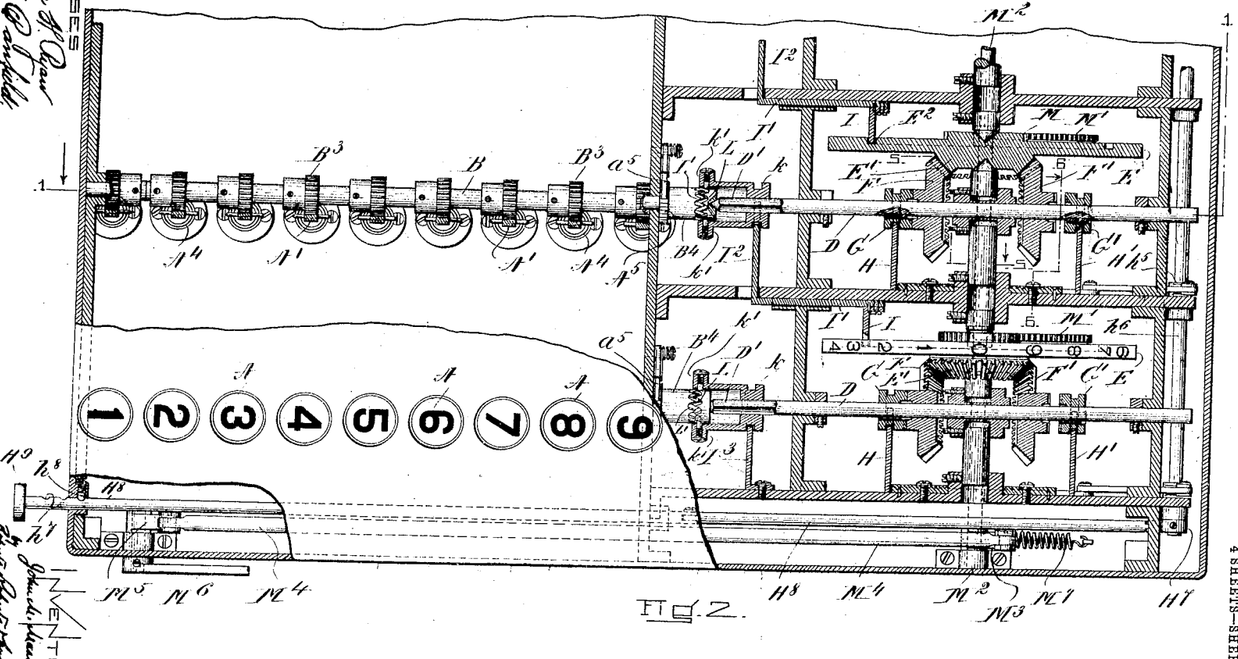
Fig. 2 is a horizontal section of the machine shown in Fig. 1, taken along the line 2—2 of Fig. 1.

(In a calculating mechanical system such as illustrated in the drawings, the first number carrier in the series will be actuated only by the mechanical train peculiar to it, and will not be controlled by any other number carrier. For the sake of uniformity in the construction of interchangeable parts, the mode of coupling the key shaft to the carrier actuating shaft of this first number carrier may be structurally identical with that of the other number carriers, as shown in Fig. 2. But, in order to prevent inadvertent operation of this coupling, a stationary fork $I^3$ is secured to the casing, to hold the coupling in fixed longitudinal relation with shaft B.)

Figure 3:
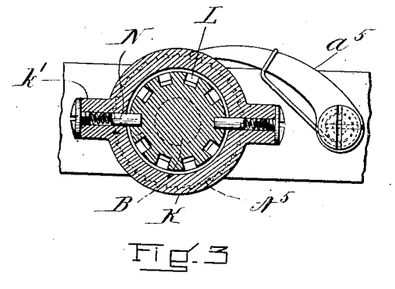
Fig. 3 is a detail on an enlarged scale taken on the line 3—3 of Fig. 4.

The specific mode herein shown by which I accomplish this is as follows: In the side of each number carrier disk E a cam groove E² is cut, this groove having its active inclined portions diametrically opposite each other at e². The cam follower consists of the finger I (see Fig. 2) which is secured to the slide bar I' which in turn carries the coupling-shipper I² (see Figs. 2 and 4). When the cam incline at e² passes the finger I, the shipper I² moves the coupling K in one direction or the other according to the slope-direction of the cam incline e². The pawl a⁵ (see Figs. 2 and 3) prevents backward rotation of the shaft B by engaging with the ratchet teeth A⁵ on said shaft; consequently, when the coupling K is moved by the shipper I², the bolts N, sliding in the zigzag groove L, compel the coupling K to turn and to rotate the shaft D through an angle which causes the number carrier E, driven thereby, to turn through one number space. This increment of movement produced by the action of one number carrier upon the next is imparted to the moved number carrier independently of its shaft B or the key mechanism for operating it, and it makes no difference whether the shaft B is operating to move its number carrier or not; the increment of movement imparted by one number carrier to the next will invariably be transmitted, although it may be simultaneous with the movement of the number carrier imparted to it through its peculiar train of mechanism by the depression of one of the keys. In order that the rotative movement of the coupling K, caused by its longitudinal movement under control of the shipper I², may always be in the same direction, the zigzag groove L (see Fig. 4) has its bottom cut so that at each turn of the zigzag groove there is a shoulder L' which prevents the bolts N from moving in any direction except in advance toward the next shoulder. In this respect, the bottom of the groove L is a zigzag ratchet in relation to which the bolts N operate as pawls, while the sides of the zigzag groove L form cam surfaces in relation to which the bolts N operate as followers; or rather as pushers, to give the coupling K a rotative movement as the shipper slides it longitudinally over the head B⁴ of the shaft B. Thus, each mechanical train peculiar to a number carrier is composed of two divisions, shaft B constituting with its keys and key clutches, the driving division, and shaft D, with the bevel gears and reversing clutches, the driven division. These two divisions are connected so that movement of the driving division is imparted to the driven division while the driven division may be moved independently of the driving division. The ratchet connection between these two divisions typifies this condition.

The mechanism by which the calculator converts its operation from one of addition to one of subtraction is as follows: The number carriers E are each provided with a bevel gear E' which may mesh with either of the bevel gears F, F', which are loosely mounted upon the shaft D. Each of the gears F, F', has a clutch member formed upon its hub which is adapted to engage with one of the sliding clutch members G, G', which turn with, but slide on, the shaft B (see Figs. 1, 2, 5 and 6). When one of the clutch members G, G', is in engagement with the clutch member of the bevel gear adjacent to it, the other is out of engagement so that the direction of rotation of the number carrier E is determined by the alternative operation of the clutch members G, G'. These clutch members are controlled and operated as follows: A clutch shipper, mounted to slide longitudinally is provided with forks H, H' which engage respectively with the clutch members G, G'. These forks are united by a slide bar (preferably integral with the forks) which is provided with a straight longitudinal sliding member H² and intermediate offset connections H³. The sliding members H² are guided by slide blocks H⁶. An arm H⁴ is articulately connected to the link H⁵ which in turn is pinned to a crank h⁵ on the transverse shaft h⁶. On the end of the transverse shaft h⁶ is the crank H⁷ and to this is connected the bar H⁸ which terminates in the knob H⁹ outside the casing (see Figs. 1 and 2). A spring-controlled pin h⁸ engages with any one of the three notches h⁷ formed in the outer end of the bar H⁸. When the bar H⁸ is pulled out to the position shown in Fig. 1 the above described connections cause the clutch member G to be slid into engagement with the bevel gear F so that the train of mechanism which actuates the number carrier E includes the shaft B, coupling K, shaft D, and bevel gear F. If the bar H⁸ be now pushed inward to the middle notch h⁷, both clutch members G, G', are shifted slightly, so that clutch member G is released from engagement with the bevel gear F, and clutch member G' though moved toward the bevel gear F', nevertheless, does not engage with it. With the parts in this condition the number carriers are freed from all control by their actuating mechanical trains. Further movement of the bar H⁸ inward to the position where the outermost notch h⁷ engages with the pin h⁸ brings clutch member G' into engagement with bevel gear F'. With the parts in this position the number carrier E has imparted to it movements reverse to those which it received when clutch member G was in engagement with the bevel gear F.

As the shaft B can move progressive in only one rotational direction, the ope ions performed are those of addition n the bevel gear F is the driving member immediately in control of the number carrier E; whereas the operations performed will be those of subtraction when, by the operation of the reversing mechanism, the bevel gear F' becomes the driving member in immediate control of the number carrier E. Likewise, movements of the shaft D in response to the independent operation of the clutch K will always be in the same direction and, whether the operation be one of addition or subtraction, will impart to the number carrier E increments of rotation appropriate to the arithmetical process which the mechanism is performing for the time being.

Figure 1:
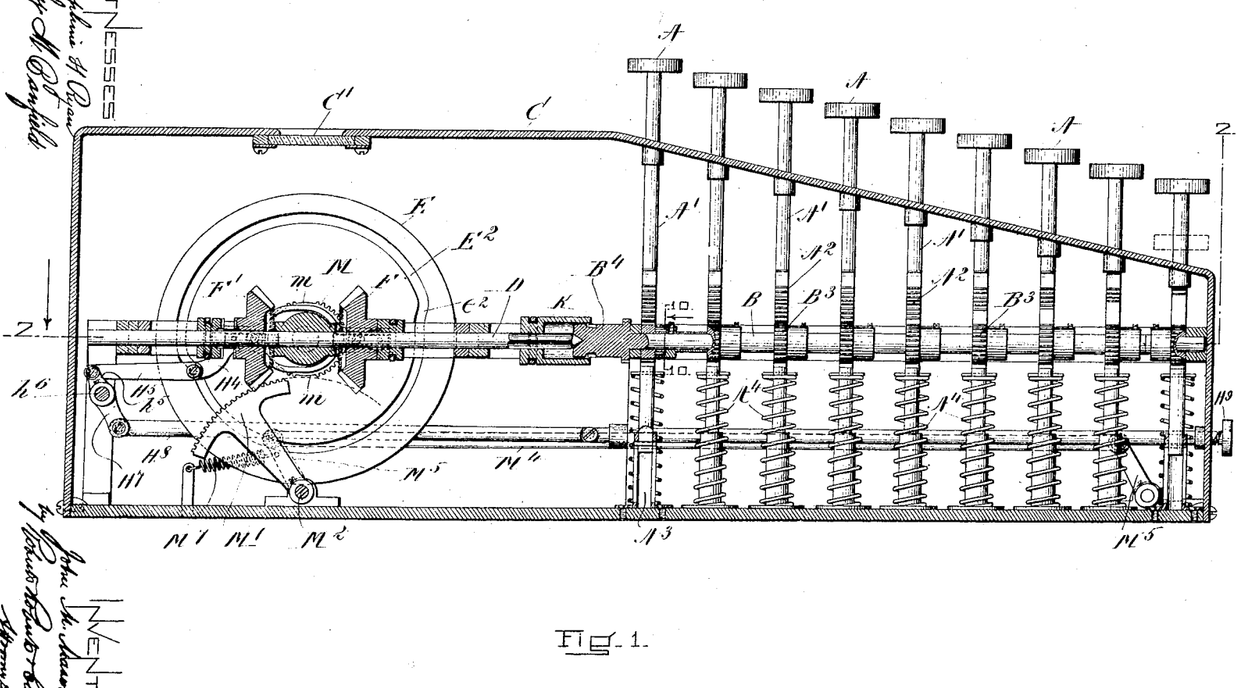
—Figure 1 is a vertical section on the line 1—1 of Fig. 2 showing partly in elevation and partly in section the calculating mechanism.

When any given calculation is completed and its result noted, it may be necessary to restore the number carriers to zero position in preparation for another calculation, in order to do this the bar $H^8$ is moved so that the middle notch $h^7$ engages with the pin $h^8$ and the number carriers E are all released from connection with their mechanical trains. Then, by moving the crank handle $M^6$ (see Fig. 2) which actuates the crank $M^4$ and pulls the bar $M^4$ toward the front of the machine, the gear sector M' is swung through its arc of movement, this sector being mounted on the transverse shaft $M^2$ which at its end carries the crank $M^3$ to which the bar $M^4$ is pinned. A spring $M^7$ operates to return the sector M' to the normal position shown in Figs. 1 and 2, when the hand of the operator releases the handle $M^6$. The sector M' meshes with the spur gear M cut upon the hub of each number carrier E. These spur gears M are not complete, but have each (as shown in Fig. 1) a blank portion $m$ so that as soon as a sector M' turns its gear M to a position where a blank space $m$ is brought to the position shown in Fig. 1 the sector M' lets go of the spur gear and ceases to actuate it and the number carrier of which it forms a part. These blank spaces $m$ are so placed that, as shown in Fig. 1, they operate to interrupt the action of the sector M' at the moment when a zero point of the number carrier comes opposite or registers with the sight aperture C'.

The operation of the above described machine is as follows: First, to place the machine for beginning a calculation, the bar $H^8$ is moved to release both the clutch members G, G', from engagement with the bevel gears in each mechanical train. Then the restoring devices operated by the crank arm $M^6$ are moved as above described to bring all the number carriers to zero position, and the restoring mechanism is then allowed to return to its normal position. Then the bar $H^8$ is pulled forward bringing all the clutches G into engagement with the bevel gears F and the machine is ready for the work of addition. The keys A are then depressed, the proper keys being selected to represent the first number in the column to be added. These keys may all be depressed simultaneously or successively in any order convenient to the operator. Each number carrier E is caused to rotate and to present to the sight aperture C' the number corresponding to the key depressed in the actuating mechanical train peculiar to it. Then the keys representing the next number to be added are depressed simultaneously or in any desired order. Each number carrier is actuated by its peculiar mechanical train as before but as a number carrier passes the zero point in its rotation, it imparts a unit increment of movement to the next number carrier in series, independently of the actuating train peculiar to the increment of the moved number carrier, mechanically performing the operation of "carrying one". If the calculation involves now the subtraction of a number from the sum resulting from the adding operation, the bar $H^8$ is moved inward to substitute the gear F' for the gear F in the driving train peculiar to each of the number carriers. Then, upon the depression of the keys appropriate to the number to be subtracted, the number carriers move in a reverse direction, the operation of a number carrier in the series upon the one next to it automatically accomplishing the carriage of tens to hundreds, or units to tens, independently of the key-operated mechanical train peculiar to the number carrier affected by the incremental operation. When the additions or subtractions are completed, the number represented by the uppermost figures on the number carriers will correctly express the result of the arithmetical calculations, provided the sum total does not exceed the mechanical capacity of the machine. Obviously, by mere duplication of the mechanical trains shown in the drawings, a calculating machine may be constructed so as to have any desired capacity.

In the machine above shown and described the relation of the number carriers are appropriate to calculations by the ordinarily used decimal system and the incremental operation of one number carrier by the next is effected by arranging the number carriers and their mechanical adjuncts in series, each number carrier and its train having control over the next in the series for the purpose of carrying decimal increments in addition or subtraction. The incremental movements from one number carrier to another may, however, differ specifically from the mechanism shown. For instance, one number carrier may be made to control the incremental movements not of the next in series but of some other further along in series, the essence of the mechanical relations being that while each number carrier is actuated by its peculiar mechanical train, some number carriers are operated through the movement of others independently of the mechanical train peculiar to the incrementally moved number carrier.

What I claim and desire to secure by Letters Patent is:

1. In a calculator, the combination of a plurality of number-carriers, movable in recurrent cycles, actuating mechanical trains, each peculiar to a number-carrier, and connections from the mechanical train of one number-carrier to that of another, comprising means to impart an increment of movement of one number-carrier from the actuating mechanical train of another number-carrier, independently of the actuating mechanical train peculiar to the incrementally moved number-carrier, and reversing mechanism in the mechanical train peculiar to each number-carrier.

2. In a calculator, the combination of a plurality of number-carriers, movable in recurrent cycles, actuating mechanical trains, each peculiar to a number-carrier, and connections from the mechanical train of one number-carrier to that of another, comprising means to impart an increment of movement of one number-carrier from the actuating mechanical train of another number-carrier, independently of, though simultaneously with, the actuating train peculiar to the incrementally moved number-carrier, and reversing mechanism in the mechanical train peculiar to each number-carrier.

3. In a calculator, the combination of a plurality of number-carriers, movable in recurrent cycles, actuating mechanical trains, each peculiar to a number-carrier, and connections from one number-carrier to another, comprising means to impart an increment of movement of one number-carrier from another, independently of the actuating mechanical train peculiar to the incrementally moved number-carrier, and reversing mechanism in the mechanical train peculiar to each number-carrier.

4. In a calculator, the combination of a plurality of number-carriers, movable in recurrent cycles, actuating mechanical trains, each peculiar to a number-carrier, and connections from one number-carrier to another, comprising means to impart an increment of movement of one number-carrier from another number-carrier independently of, though simultaneously with, the actuating train peculiar to the incrementally moved number-carrier, and reversing mechanism in the mechanical train peculiar to each number-carrier.

5. In a calculator, the combination of a series of number-carriers, movable in recurrent cycles, actuating mechanical trains each peculiar to a number-carrier, and connections from the mechanical train of each number-carrier to that of the next in series, comprising means to impart an increment of movement from the actuating mechanical train of one number-carrier to the next in series, independently of the actuating mechanical train peculiar to the incrementally moved number-carrier, and reversing mechanism in the mechanical train peculiar to each number-carrier.

6. In a calculator, the combination of a series of number-carriers movable in recurrent cycles, actuating mechanical trains each peculiar to a number-carrier, and connections from the mechanical train of each number-carrier to that of the next in series, comprising means to impart an increment of movement from the actuating mechanical train of one number-carrier to the next in series independently of, though simultaneously with, the actuating mechanical train peculiar to the incrementally moved number-carrier, and reversing mechanism in the mechanical train peculiar to each number-carrier.

7. In a calculator, the combination of a series of number-carriers, movable in recurrent cycles, actuating mechanical trains, each peculiar to a number-carrier, and connections from each number-carrier to the next in series, comprising means to impart an increment of movement from one number-carrier to the next in series, independently of the actuating mechanical train peculiar to the incrementally moved number-carrier, and reversing mechanism in the mechanical train peculiar to each number-carrier.

8. In a calculator, the combination of a series of number-carriers movable in recurrent cycles, actuating mechanical trains each peculiar to a number-carrier, and connections from each number-carrier to the next in series, comprising means to impart an increment of movement from one number-carrier to the next in series independently of, though simultaneously with, the actuating mechanical train peculiar to the incrementally moved number-carrier, and reversing mechanism in the mechanical train peculiar to each number-carrier.

9. In a calculator, the combination of a plurality of number-carriers movable in recurrent cycles, actuating mechanical trains, each peculiar to a number-carrier, some of said trains comprising each a driving and a driven division and a ratchet connection between said division, and connections between the driven division of one mechanical train to another mechanical train to impart to said driven division increments of movement independently of the driving division associated with it, and reversing mechanisms in said driven divisions.

10. In a calculator, the combination of a plurality of number-carriers movable in recurrent cycles, actuating mechanical trains each peculiar to a number-carrier, a cam carried by each mechanical train, provided with active portions corresponding to the cycle recurrence of the number-carrier, followers for said cams, the mechanical trains comprising each a driving and a driven division and a ratchet connection between said divisions, and connections between the driven division of one train to the cam-follower of another, to impart to said driven division increments of movement corresponding to cycle recurrence of the cam controlling said follower, independently of the driving division associated with said driven division.

11. In a calculator, the combination of a plurality of number-carriers movable in recurrent cycles, actuating mechanical trains each peculiar to a number-carrier, a cam carried by each mechanical train, provided with active portions corresponding to the cycle recurrence of the number-carrier, followers for said cams, the mechanical trains comprising each a driving and a driven division and a ratchet connection between said divisions, and connections between the driven division of one train to the cam-follower of another, to impart to said driven division increments of movement corresponding to cycle recurrence of the cam controlling said follower, independently of the driving division associated with said driven division, and reversing mechanisms in said driven divisions.

12. In a calculator, the combination of a plurality of number-carriers movable in recurrent cycles, actuating mechanical trains, each peculiar to a number-carrier, and comprising each two divisions, a coupling between the divisions rotatively fixed to one division and push-connected to the other, connections from each coupling to a member of the actuating train peculiar to another number-carrier, said connections including a shipper in constant control of the coupling, and a shipper actuator active once in the recurrent cycle of said other number-carrier and carried by the mechanical train thereof, to move the coupling and the train division to which it is rotatively fixed, independently of the train division to which it is push-connected.

13. In a calculator, the combination of a plurality of number-carriers movable in recurrent cycles, actuating mechanical trains, each peculiar to a number-carrier, and comprising each two divisions, a coupling between the divisions rotatively fixed to one division and push-connected to the other, connections from each coupling to a member of the actuating train peculiar to another number-carrier, said connections including a shipper in constant control of the coupling, and a shipper actuator active once in the recurrent cycle of said other number-carrier and carried by the mechanical train thereof, to move the coupling and the train division to which it is rotatively fixed, independently of the train division to which it is push-connected, and reversing mechanisms in the several trains between the couplings and number-carriers.

14. In a calculator, the combination of a plurality of number-carriers movable in recurrent cycles, actuating mechanical trains, each peculiar to a number-carrier, and comprising each two divisions, one a driving division, the other a driven division whereof the number-carrier is the terminal member, a coupling rotating with and sliding on the driven division, a zigzag cam, carried by the driving division, a cam follower therein, carried by the coupling, a cam, having portions coincident in action with cycle recurrence, carried by the driven division of another number-carrier train, a shipper controlled by the latter cam and in constant control of the coupling, to slide the coupling, and incrementally rotate the driven division in relation to the driving division, as the shipper-controlling number-carrier train completes its cycle of movement.

15. In a calculator, the combination of a plurality of number-carriers, movable in recurrent cycles, actuating mechanical trains, each peculiar to a number-carrier, and comprising each two divisions, one a driving division, the other a driven division whereof the number-carrier is the terminal member, a coupling rotating with and sliding on the driven division, a zigzag cam, carried by the driving division, a cam follower therein carried by the coupling, a cam, having portions coincident in action with cycle recurrence, carried by the driven division of another number-carrier train, a shipper controlled by the latter cam and in constant control of the coupling, to slide the coupling, and incrementally rotate the driven division in relation to the driving division, as the shipper-controlling number-carrier train completes its cycle of movement, and reversing mechanisms in the driven divisions of the trains.

16. In a calculator, the combination of a plurality of number-carriers, movable in recurrent cycles, actuating mechanical trains, each peculiar to a number-carrier, and comprising each a driving and a driven division whereof the number-carrier is the terminal member, a coupling rotating with and sliding on one of the divisions, a zigzag cam in the other division and ratchet and pawl connections between the cam-carrying division and the coupling, a cam follower in said zigzag cam, carried by the coupling, a cam having portions coincident in action with cycle recurrence, carried by the driven division of another number-carrier train, a shipper controlled by the latter cam and in constant control of the coupling, to slide the coupling and incrementally rotate the train division carrying said coupling, in relation to the train division carrying said zigzag cam, as the shipper controlling number-carrier train completes its cycle of movement.

17. In a calculator, the combination of a plurality of number-carriers, movable in recurrent cycles, actuating mechanical trains, each peculiar to a number-carrier, and comprising each a driving and driven division whereof the number-carrier is the terminal member, a coupling rotating with and sliding on one of the divisions, a zigzag cam in the other division and ratchet and pawl connections between the cam-carrying division and the coupling, a cam follower in said zigzag cam, carried by the coupling, a cam having portions coincident in action with cycle recurrence, carried by the driven division of another number-carrier train, a shipper controlled by the latter cam and in constant control of the coupling, to slide the coupling and incrementally rotate the train division carrying said coupling, in relation to the train division carrying said zigzag cam, as the shipper controlling number-carrier train completes its cycle of movement, and reversing mechanisms in the driven divisions of the trains.

Signed by me at Boston, Suffolk county, Massachusetts, this sixteenth day of March 1908.

JOHN M. MASON.

Witnesses:
 ODIN ROBERTS,
 CHARLES D. WOODBERRY.